(12) United States Patent
Schramm et al.

(10) Patent No.: US 7,641,230 B2
(45) Date of Patent: Jan. 5, 2010

(54) EXTENDED FILL INFLATION APPARATUS

(75) Inventors: Michael R. Schramm, Perry, UT (US); David J. Green, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 281 days.

(21) Appl. No.: 11/153,694

(22) Filed: Jun. 15, 2005

(65) Prior Publication Data

US 2006/0284402 A1 Dec. 21, 2006

(51) Int. Cl.
*B60R 21/26* (2006.01)

(52) U.S. Cl. .................. 280/736; 280/741; 280/742

(58) Field of Classification Search .............. 280/741, 280/742, 736, 737
See application file for complete search history.

(56) References Cited

U.S. PATENT DOCUMENTS

| 5,582,428 | A | 12/1996 | Buchanan et al. | |
|---|---|---|---|---|
| 5,593,180 | A * | 1/1997 | Cuevas et al. | 280/741 |
| 5,630,619 | A | 5/1997 | Buchanan et al. | 280/741 |
| 6,145,876 | A | 11/2000 | Hamilton | |
| 6,231,079 | B1 * | 5/2001 | Perotto et al. | 280/737 |
| 6,543,806 | B1 | 4/2003 | Fink | 280/737 |
| 6,672,616 | B2 * | 1/2004 | Jonsson et al. | 280/737 |
| 6,719,016 | B1 | 4/2004 | Fink | |
| 6,779,811 | B2 * | 8/2004 | Lebaudy et al. | 280/730.2 |
| 7,192,052 | B2 * | 3/2007 | Smith et al. | 280/737 |
| 2003/0062713 | A1 | 4/2003 | Young et al. | |
| 2003/0178820 | A1 | 9/2003 | Green et al. | |
| 2003/0178827 | A1 | 9/2003 | Dinsdale et al. | |
| 2003/0178829 | A1 | 9/2003 | Dinsdale et al. | |
| 2005/0062273 | A1 * | 3/2005 | Matsuda et al. | 280/737 |

FOREIGN PATENT DOCUMENTS

| DE | 4029441 A1 | 4/1991 |
|---|---|---|
| DE | 4224927 A1 | 2/1994 |
| DE | 4410574 A1 | 10/1994 |
| DE | 19628836 A1 | 1/1998 |

* cited by examiner

*Primary Examiner*—Eric Culbreth
(74) *Attorney, Agent, or Firm*—Sally J Brown; Stoel Rives, LLP

(57) ABSTRACT

Disclosed are methods, systems, and apparatus for inflating airbags. In one embodiment, an initiator is deployed to open an exit gas port, through which the airbag is inflated. The airbag is primarily inflated via gas from a first gas chamber and is substantially maintained in an inflated state for a predetermined period of time primarily via gas from a second gas chamber. In one embodiment, an airbag inflator is provided which comprises a first gas chamber, a second gas chamber, and an intermediate chamber assembly. The intermediate chamber assembly comprises a first gas port positioned adjacent to and in fluid communication with the first gas chamber and a second gas port positioned adjacent to and in fluid communication with the second gas chamber. The inflator is configured to allow a greater flow rate of gas through the first gas port upon deployment than through the second gas port.

12 Claims, 3 Drawing Sheets

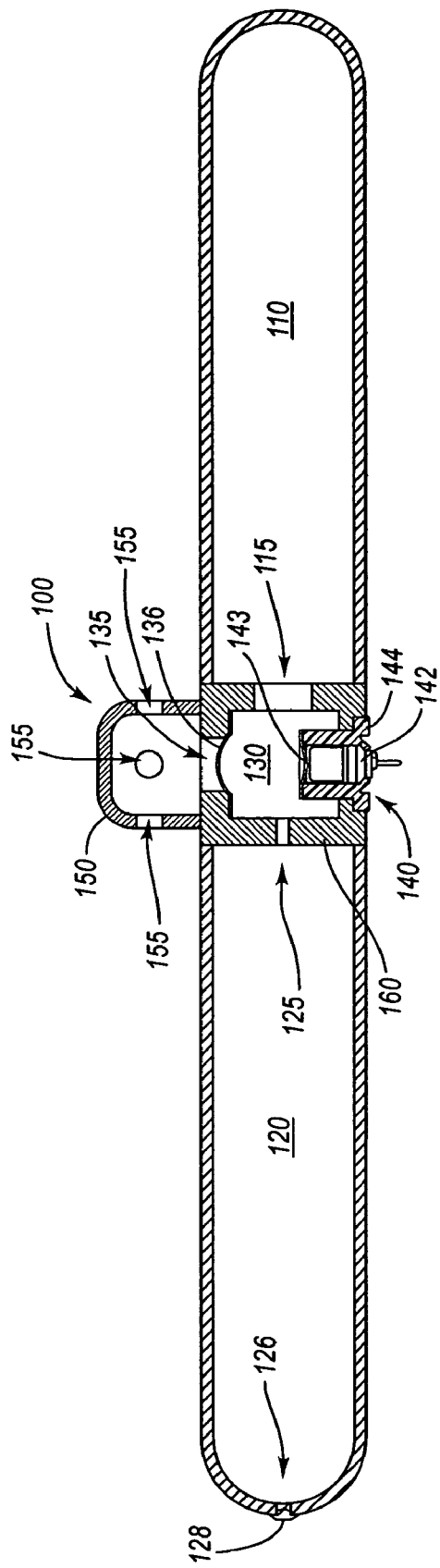
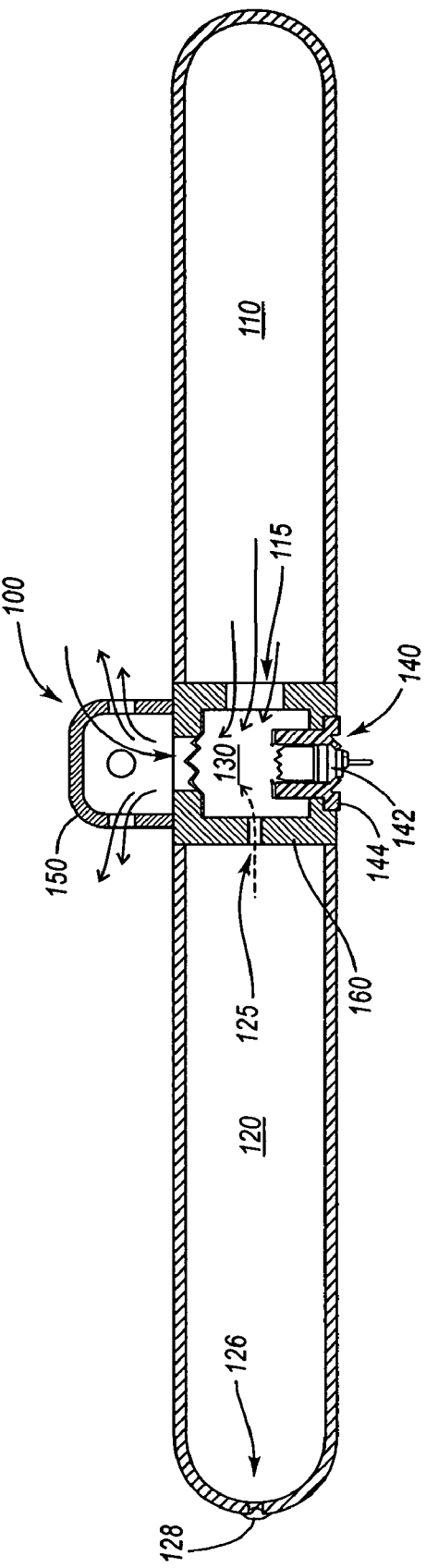

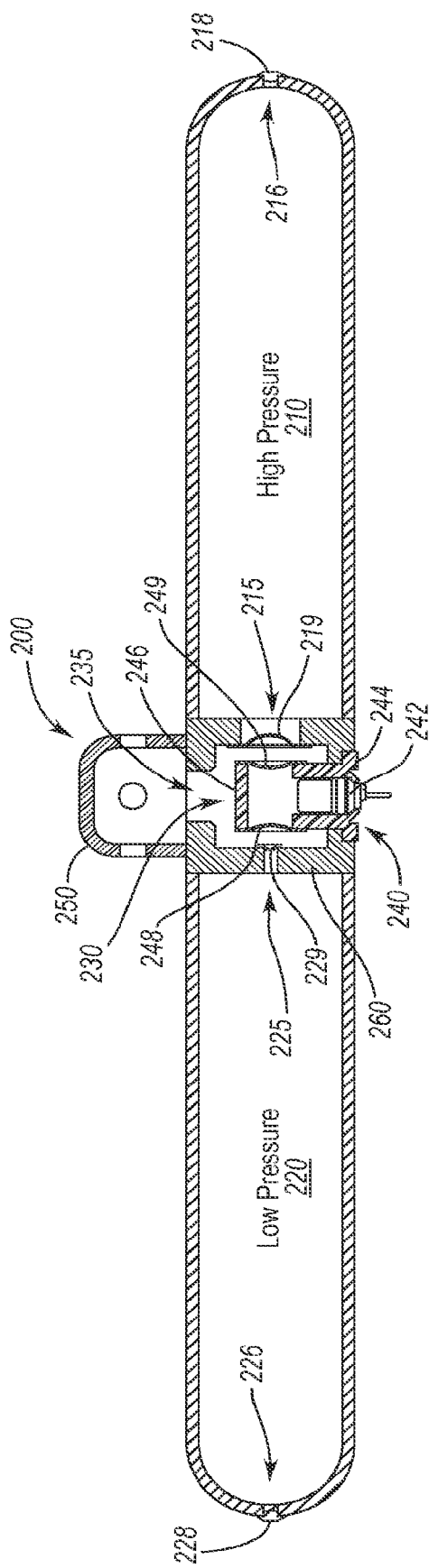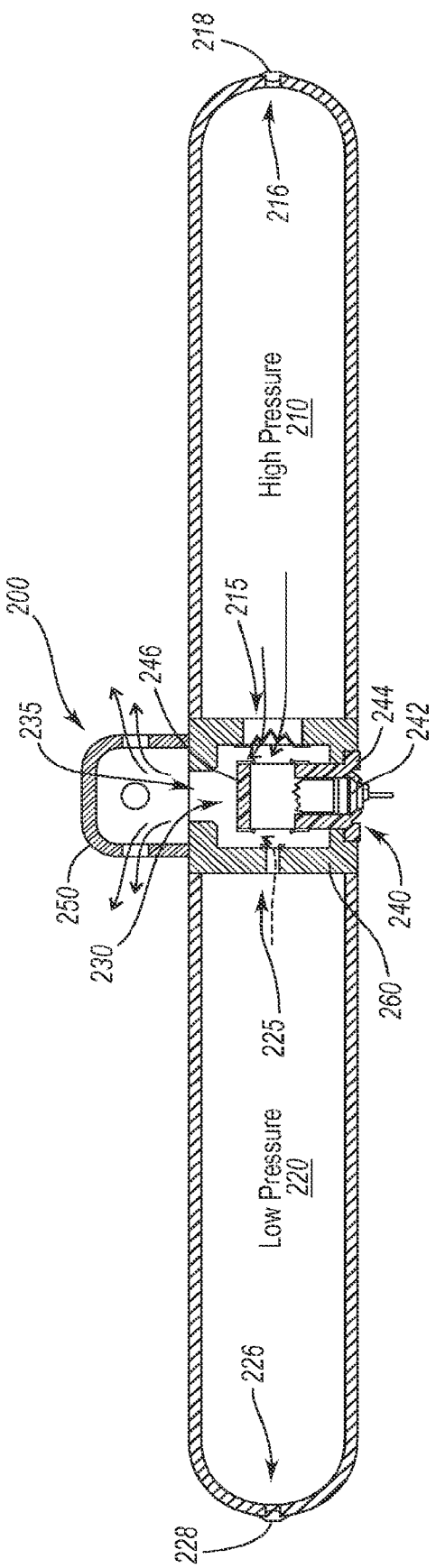

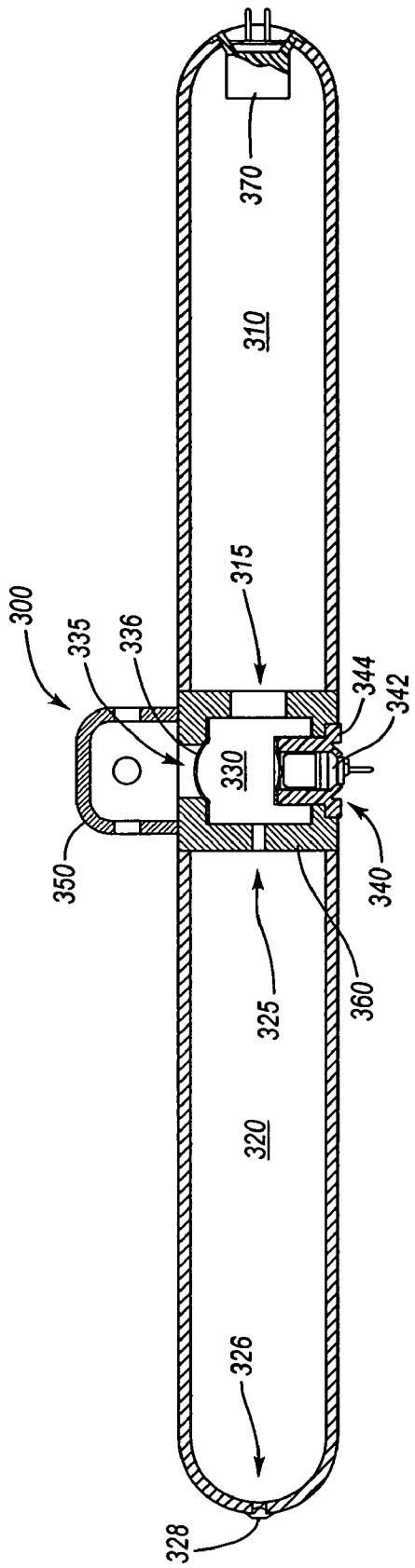
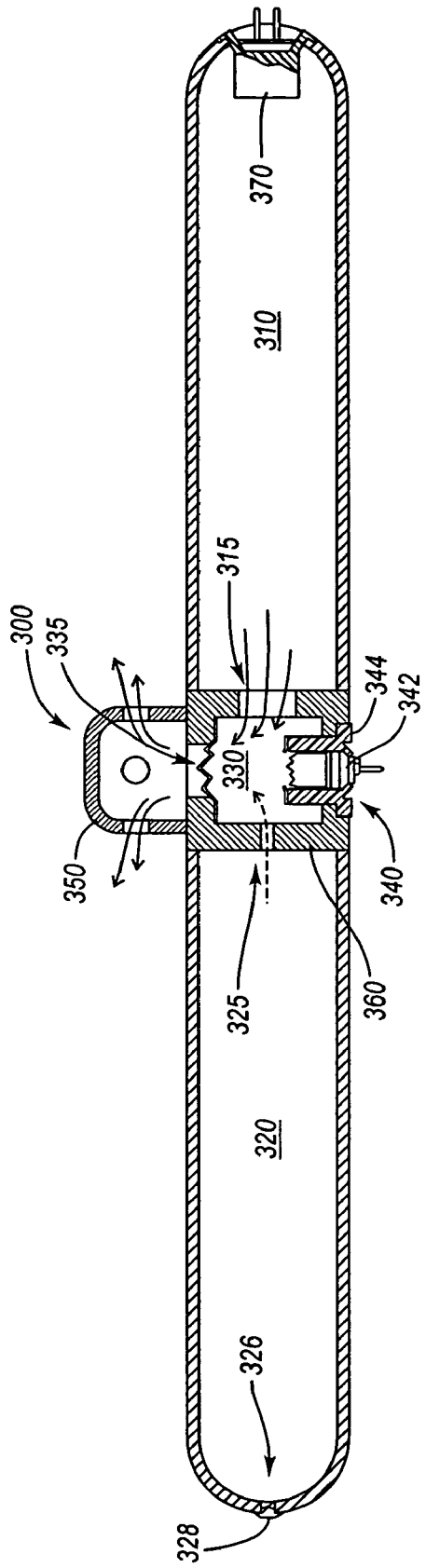

EXTENDED FILL INFLATION APPARATUS

TECHNICAL FIELD

The present invention relates generally to the field of automotive protective systems. More specifically, the present invention relates to inflators and airbag systems.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 1 is a cross-sectional view of one embodiment of an inflator apparatus.

FIG. 2 is a cross-sectional view of the embodiment of FIG. 1 following deployment of the initiator.

FIG. 3 is a cross-sectional view of a second embodiment of an inflator apparatus.

FIG. 4 is a cross-sectional view of the embodiment of FIG. 3 following deployment of the initiator.

FIG. 5 is a cross-sectional view of still another embodiment of an inflator apparatus.

FIG. 6 is a cross-sectional view of the embodiment of FIG. 5 following deployment of the initiator.

DETAILED DESCRIPTION OF PREFERRED EMBODIMENTS

Described below are embodiments of an inflation apparatus for airbag systems. Generally, in the embodiment shown in the accompanying figures the inflator includes two gas chambers containing pressurized gas. A first gas port is positioned to be in fluid communication with the first gas chamber and a second gas port is positioned to be in fluid communication with the second gas chamber. A third gas port, otherwise referred to as an exit gas port, is positioned to be in fluid communication, directly or indirectly, with an inflatable airbag. An initiator is positioned and configured to rupture a burst disk that temporarily prevents fluid communication through the exit gas port.

Upon deployment of the initiator and accompanying rupturing of the burst disk, the pressurized gas from the first and second chambers passes through the first and second gas ports, respectively, after which it passes through the exit gas port and ultimately into the inflatable airbag. The inflator is configured to allow a greater flow rate of gas through the first gas port than through the second gas port. In this manner, the airbag may be primarily inflated via gas from one gas chamber, after which the airbag may be substantially maintained in an inflated state for a predetermined period of time primarily via gas from the other gas chamber. Allowing a greater volume of gas to pass through one of the chamber gas ports may be achieved in a number of ways.

For instance, in one embodiment the higher flow rate may be achieved by making the first gas port larger than the second gas port. In another embodiment, the higher flow rate through the first gas port may be achieved by isolating the chambers and storing gas at a higher pressure in the first chamber than the second chamber. In still another embodiment, the first gas chamber may include a heater. In this embodiment, the higher flow rate through the first gas port may be achieved by increasing the gas pressure in the first gas chamber with the heater.

With reference to the accompanying figures, embodiments of the invention will now be described in greater detail. In FIGS. 1-2, an inflator apparatus 100 is shown. Inflator 100 includes first gas chamber 110 and second gas chamber 120. Gas chambers 110 and 120 each store a quantity of pressurized gas. The quantities of gas stored in each chamber may be equal or unequal, depending on the characteristics of the inflator and the desired properties thereof. One having ordinary skill in the art will also appreciate that, although chambers 110 and 120 are depicted as having the same size and shape, this need not be the case. Chambers 110 and 120 can be of any desired shape and size, and may differ in size and/or shape between one another in a single embodiment. Chamber 120 also has a fill port 126, which is blocked with fill port plug 128 in FIGS. 1 and 2.

An intermediate chamber 130 is defined by an intermediate chamber assembly 160. Intermediate chamber assembly 160 is connected with both gas chambers 110 and 120, which in the depicted embodiment are situated across from one another on opposing sides of the intermediate chamber assembly 160. Intermediate chamber assembly 160 in FIGS. 1 and 2 has four ports. First gas port 115 is situated to facilitate fluid communication between the first gas chamber 110 and the intermediate chamber 130. Second gas port 125 is situated to facilitate fluid communication between the second gas chamber 120 and the intermediate chamber 130. Exit gas port 135 is situated to facilitate fluid communication between intermediate chamber 130 and an inflatable airbag cushion. Finally, initiator mounting port 140 allows for an initiator 142 to be mounted in or on the intermediate chamber assembly 160. An initiator mount assembly 144 may be used to facilitate mounting the initiator 142 in the initiator mounting port 140.

As can be seen from the figures, gas port 115 is larger than gas port 125. This allows for a greater flow rate of gas through gas port 115 than through gas port 125 at a given pressure. The reasons for providing gas chambers that discharge at uneven rates will be apparent and will be described later in connection with a description of the use of an embodiment of the inflator apparatus.

Optionally, a diffuser may be positioned adjacent to the gas exit port. In FIGS. 1-2, gas diffuser 150 is shown. Diffuser 150 has diffuser ports 155 and is in fluid communication with intermediate chamber 130 via exit port 135.

A closure member may be positioned and configured to block fluid communication through the gas exit port until the initiator is deployed. In the embodiment shown in FIG. 1, the closure member comprises a burst disk shown at 136. A second burst disk, shown at 143, is positioned adjacent to the initiator 142 in this embodiment. Alternative closure members may be used, as those having ordinary skill in the art will appreciate.

FIG. 2 shows inflation apparatus 100 following deployment of the initiator 142. Deployment of initiator 142 ruptures burst disk 143 and burst disk 136. Pressurized gas from chambers 110 and 120 can then pass through ports 115 and 125, after which the gas can pass through exit port 135 and ultimately into the airbag. Because gas port 115 is larger than gas port 125, the gas flow rate from chamber 110 is much higher than that from chamber 120, as represented by the arrows in FIG. 2. Moreover, because of the lower rate of gas flow from chamber 120, chamber 120 will take longer to empty. As a result, the airbag may be primarily inflated via the gas from gas chamber 110 and maintained in an inflated state for a predetermined period of time primarily via gas from gas chamber 120. In other words, gas from chamber 120 may continue to flow into the airbag after all or a high percentage of the gas from chamber 110 has been depleted, thereby providing an extended fill airbag system.

Another embodiment is shown in FIGS. 3 and 4. Inflator apparatus 200 includes high pressure gas chamber 210 and low pressure gas chamber 220. As the names indicate, gas is stored at a higher pressure in chamber 210 than in chamber 220. Once again an intermediate chamber 230 is defined by an intermediate chamber assembly 260. Intermediate chamber assembly 260 in FIGS. 3 and 4 also has four ports, including first gas port 215, second gas port 225, exit gas port 235, and initiator mounting port 240.

In order to maintain chamber 210 at a higher pressure than chamber 220, ports 215 and 225 are blocked with burst disks 219 and 229, respectively, such that they are isolated from one another. Both chambers also have fill ports and fill port plugs. High pressure chamber 210 has fill port 216 occupied by fill port plug 218, whereas low pressure chamber 220 has fill port 226 occupied by fill port plug 228.

Initiator mount assembly 244 differs significantly from initiator mount assembly 144. Specifically, initiator mount assembly 244 includes a tunnel portion 246. Tunnel portion 246 may be included to provide a way to direct the shock wave generated by the initiator 242 towards burst disks 219 and 229. As shown in FIG. 3, tunnel portion may optionally include additional burst disks at either end, shown at 248 and 249 in the figure. Of course, it should be understood that similar embodiments could be used which provide isolated high and low pressure chambers like inflator apparatus 200, but which use an initiator mount assembly that does not have a tunnel portion, such as those shown in FIGS. 1 and 2 at 144.

As shown in FIG. 4, each of the burst disks are ruptured by deployment of the initiator 242, thereby allowing fluid communication from chambers 210 and 220 to inflate the airbag. As shown by the arrows in FIG. 4, and in part due to the higher pressure in chamber 210, the flow rate through port 215 is initially higher than the flow rate through port 225. In this manner, the airbag may be primarily inflated via gas from gas chamber 210 and substantially maintained in an inflated state for a predetermined period of time primarily via gas from gas chamber 220.

Still another embodiment is shown and will now be described with reference to FIGS. 5 and 6. Inflator apparatus 300 is similar to the embodiment shown in FIGS. 1 and 2 in that it includes a first gas chamber 310 and a second gas chamber 320 that are not isolated from one another. In other words, both chambers contain pressurized gas at the same pressure. This embodiment differs from all of the previous embodiments, however, in that it includes a heater 370 disposed within gas chamber 310.

Heater 370 may be activated simultaneously with, or just prior to, deployment of initiator 342. In this manner, the pressure of the gas in chamber 310 can be increased at the time of or just prior to deployment. This further facilitates allowing the airbag to be primarily inflated by gas from gas chamber 310 and substantially maintained in an inflated state for a predetermined period of time primarily by gas from gas chamber 320.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. An airbag inflator, comprising:
    a first gas chamber;
    a second gas chamber;
    an intermediate chamber assembly comprising a first gas port positioned adjacent to and in fluid communication with the first gas chamber and a second gas port positioned adjacent to and in fluid communication with the second gas chamber, wherein the inflator is configured to allow a greater flow rate of gas through the first gas port upon deployment than through the second gas port, and wherein the intermediate chamber assembly further comprises a gas exit port in fluid communication with an airbag cushion; and
    an initiator positioned to deploy into the intermediate chamber assembly.

2. The airbag inflator of claim 1, wherein a closure member is positioned and configured to block fluid communication through the gas exit port until the initiator is deployed.

3. The airbag inflator of claim 2, wherein the closure member comprises a burst disk.

4. The airbag inflator of claim 3, wherein a second burst disk is positioned adjacent to the initiator.

5. An airbag inflator, comprising:
    a first gas chamber;
    a second gas chamber; and
    an intermediate chamber assembly comprising a first gas port positioned adjacent to and in fluid communication with the first gas chamber and a second gas port positioned adjacent to and in fluid communication with the second gas chamber, wherein the inflator is configured to allow a greater flow rate of gas through the first gas port upon deployment than through the second gas port, and wherein the intermediate chamber assembly further comprises a gas exit port in fluid communication with an airbag cushion,
    wherein the first gas chamber includes a heater, and wherein the higher flow rate through the first gas port is achieved by increasing the pressure in the first gas chamber with the heater.

6. An intermediate chamber assembly for connecting two gas chambers together, comprising:
    a first gas port configured to be positioned adjacent to a first gas chamber;
    a second gas port configured to be positioned adjacent to a second gas chamber, wherein the first gas port is larger than the second gas port so as to allow a greater volume of gas to gass therethrough at a given pressure upon deployment relative to the second gas port;
    an initiator mounting port configured to receive an initiator; and
    a gas exit port configured to direct gas into an airbag.

7. The intermediate chamber assembly of claim 6, further comprising a diffuser connected to the intermediate chamber assembly around the gas exit port.

8. The intermediate chamber assembly of claim 6, further comprising a closure member positioned in and selectively blocking fluid communication through the gas exit port.

9. The intermediate chamber assembly of claim 8, wherein the closure member comprises a burst disk.

10. The intermediate chamber assembly of claim 9, wherein a second burst disk is connected with the initiator mounting port.

11. The intermediate chamber assembly of claim 6, wherein the first gas port is at least twice as large as the second gas port.

12. An airbag inflator, comprising:
- a first gas chamber;
- a second gas chamber; and
- an intermediate chamber assembly defining an intermediate gas chamber and comprising a first gas port positioned adjacent to and in fluid communication with the first gas chamber and a second gas port positioned adjacent to and in fluid communication with the second gas chamber,
- wherein the first gas port is larger than the second gas port so as to allow a greater volume of gas to gass therethrough at a given pressure upon deployment relative to the second gas port,
- wherein the intermediate chamber assembly further comprises a gas exit port in fluid communication with an airbag cushion; and
- an initiator mounting port, and wherein both the gas exit port and the initiator mounting port have burst disks positioned therein.

\* \* \* \* \*